No. 820,667. PATENTED MAY 15, 1906.
G. A. PADDOCK.
HARVESTER REEL.
APPLICATION FILED APR. 27, 1903.
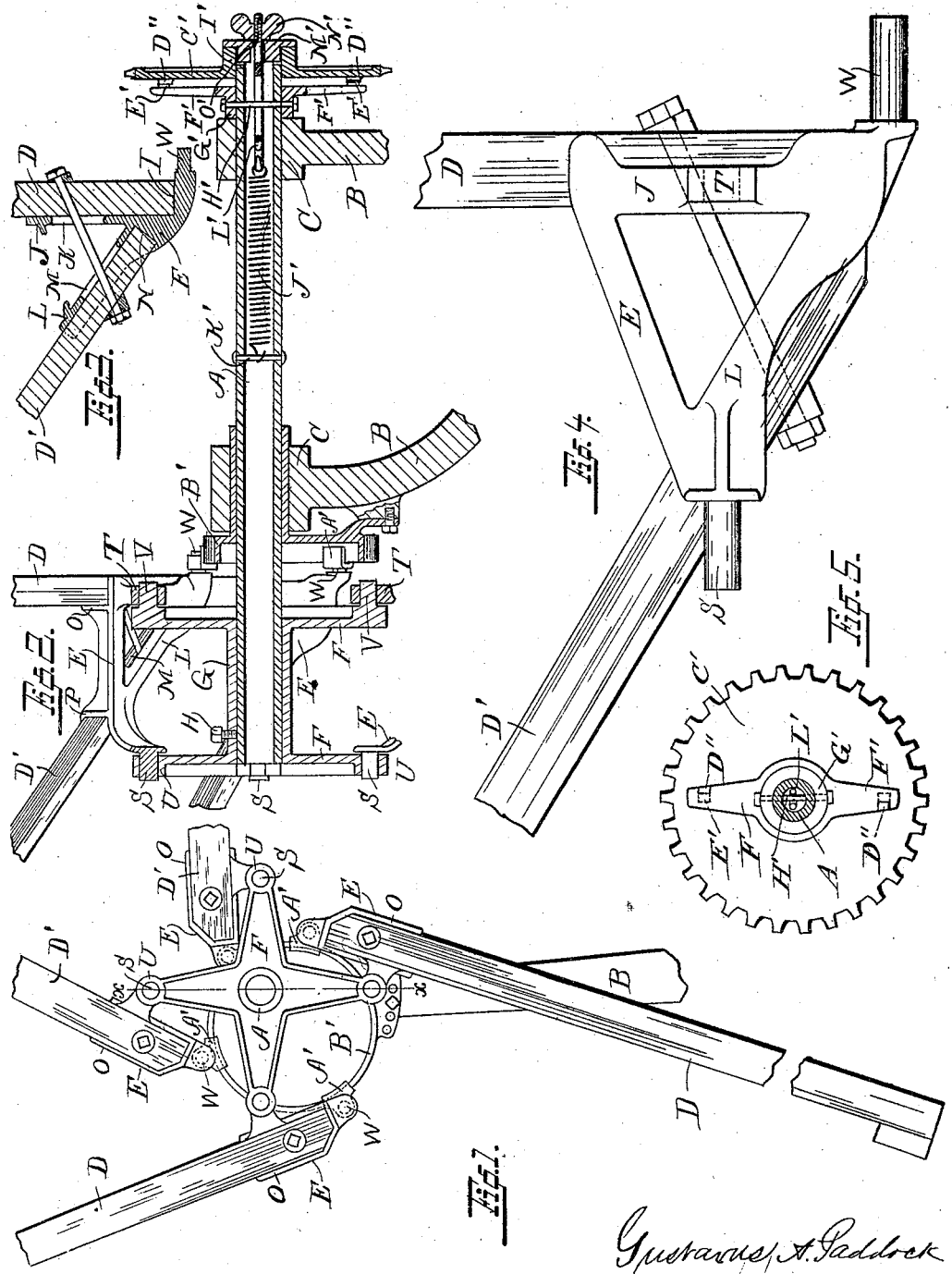
WITNESSES:
INVENTOR.
Gustavus A. Paddock
BY Erwin F. Wheeler
ATTORNEYS.

UNITED STATES PATENT OFFICE.

GUSTAVUS A. PADDOCK, OF BEAVER DAM, WISCONSIN.

HARVESTER-REEL.

No. 820,667.  Specification of Letters Patent.  Patented May 15, 1906.

Application filed April 27, 1903. Serial No. 154,404.

*To all whom it may concern:*

Be it known that I, GUSTAVUS A. PADDOCK, a citizen of the United States, residing at Beaver Dam, county of Dodge, and State of Wisconsin, have invented new and useful Improvements in Harvester-Reels, of which the following is a specification.

My invention relates to improvements in harvester-reels, and it pertains more especially, first, to the device for attaching the radial arms of the reel to the hub, and, second, to the device for yieldingly connecting the reel-supporting shaft to the driving-gear, whereby when the reel is accidentally stopped by contact with a stationary object the contact-bearings of the driving-gear are automatically thrown out of engagement with similar contact-bearings connected with the reel-supporting shaft whereby the harvester is permitted to move without revolving the reel.

My invention is further explained by reference to the accompanying drawings, in which—

Figure 1 represents an end view of the central portion of the reel. Fig. 2 is a longitudinal section drawn on line $x\ x$ of Fig. 1. Fig. 3 is a detail in section of one of the brackets by which one of the four sets of radial arms is supported, four of such sets being used in each reel. Fig. 4 is a plan view of the device shown in Fig. 3, and Fig. 5 is a detail showing a front view of the arms F' looking toward the sprocket-wheel C' in Fig. 2.

Like parts are identified by the same reference-letters throughout the several views.

The reel-supporting shaft A is revolubly supported from the frame of the harvester (not shown) in the ordinary way by arms B B and journal-bearings C C. The several sets of radial arms D and D' are connected with one end of the shaft A by the several angular brackets E, central star-shaped brackets or wheels F, and tubular sleeve G. The brackets or wheels F and sleeve G are formed integral and are rigidly connected with the shaft A by a set-screw H. The bracket E comprises the arm-supporting base I, vertical arm J, provided with a bolt-receiving slot K, arm L, formed at an oblique angle to the arm J and provided with a bolt-receiving slot M and supporting-base N. The vertical bracket-arms J are provided upon their respective sides with retaining-flanges O O. The respective arms L are also provided with retaining-flanges P, by which the respective arms of the reel are held in place against the lateral strain to which they are subjected as the reel when revolving is brought in contact with the grain.

It will be understood that owing to the peculiar construction of the bracket E and the relative angles of the arms L and J to each other I am not only enabled to secure both of the reel-arms in place, but said bolt is adapted by such construction to perform the twofold function of drawing said reel-arms longitudinally down firmly into their respective sockets, while it also draws them toward each other and against their supporting-arms. For convenience in attaching said brackets E to the star-shaped brackets or walls F they are each provided at one end with a trunnion and at their opposite ends with journal-bearings T and are adapted to operate in corresponding pivotal connections formed therefor in said star-shaped wheel, the trunnion S having journal-bearings U in one side of said star-shaped wheel, while the journal-bearings T operate upon the trunnion V of the opposite side of said star-shaped wheel or bracket. The converging ends of the bracket E are provided with trunnions W, by which they are pivotally connected with the sliding bracket A', which operates on the eccentric ring or collar B', whereby the arms of the reel are given an alternate slow and fast movement as they revolve with their supporting-shaft, as heretofore more fully shown and described in a prior patent issued to me and for which reason further description herein is superfluous.

To provide for disengaging the reel from the action of the driving mechanism of the harvester when the reel is accidentally brought against a stationary object, the sprocket-wheel C', which serves as the driving-wheel of the reel, is yieldingly supported upon the shaft A, so that it is free to move independently of said shaft, and motion is communicated from said sprocket-wheel C' to said shaft A through the lateral projecting lugs D'' D'', lugs E' E', radial arms F' F', collar G', and bolt H'. The lugs D'' D'' are rigidly connected with the sides of the sprocket-wheel C', while said lugs E' E' are rigidly connected with the arms F', and the contiguous faces of said lugs are slightly beveled, so that when the reel is stopped, as stated, by contact with a stationary object the contiguous surfaces of said lugs D'' D'' and E' E' are caused to slip past each other and permit the sprocket-wheel C' to revolve without revolving the reel. It will be understood that to permit of the said lugs D'' D'' and E' E' being thus thrown out of engagement it becomes necessary to retain said bracket-wheel C' yieldingly against the bearings of said arms F'. This end is accomplished by supporting the hub I' of said sprocket-wheel slidably upon the end of the shaft A, while said wheel is held in place, so that said lugs D'' D'' and E' E' are brought in contact, as described, by the action of a spiral spring J'. The spiral spring J' is centrally located within the hollow shaft A, and its inner end is connected with said shaft by a transverse bolt K', while its opposite end is connected with the hub I' by the rod L', flange-block M', and adjustable hand-nut N', which operates on a screw-threaded bearing O', formed on said rod L'. Thus it is obvious that by turning down the nut N' on the rod L' the tension of said spring is increased, and said lugs D'' D'' and E' E' are caused to engage with each other with greater or less force, as may be required, to communicate motion from the sprocket-wheel to the reel, while the adjustment of the tension of said spring is also such as will permit said lugs D'' D'' and E' E' to slide past each other when said reel is brought in contact with a stationary object, whereby the liability of breaking said reel when suddenly stopped by contact with a stationary object is avoided. It will be understood that the several brackets E may, if desired, be formed integral with the hub.

Having thus described my invention, what I claim as new, and desire to secure by Letters Patent, is—

1. In a harvester-reel, a plurality of brackets, each comprising two arms formed at outwardly-diverging angles to each other and the longitudinal axis of the reel; a reel-arm secured to each of said bracket-arms, and a single arm-retaining bolt extending across the converging ends of said reel and bracket-arms, said bolts lying respectively approximately in planes radiating from the axis of the reel-shaft, and adapted to draw both of said reel-arms to their seats and hold them in place against the arms of said supporting-brackets.

2. In a harvester-reel; a plurality of brackets, each comprising two arms, one at an angle to the other, each provided with openings for the reception of the arm-retaining bolt and with angular side flanges for engaging the respective sides of the reel-arms; a reel-arm secured to each of said bracket-arms, and a single arm-retaining bolt extending across and through the converging ends of said reel-arms and bracket at an oblique angle to the reel-arms, and adapted, as the retaining-nut is turned down thereon, to draw both of said reel-arms to their seats and retain them in place against the arms of said supporting-bracket.

3. In a harvester-reel; the combination of a hollow reel-supporting shaft; a hub comprising two wheels, and a connecting-sleeve formed integrally, secured to one end of said shaft; a plurality of brackets, each comprising two arms, one a radial arm formed at nearly right angles to the longitudinal axis of the reel, and the other at an oblique angle to such axis, said brackets being each pivotally connected at their respective sides with the respective sides of said hub; a reel-arm secured to each of said bracket-arms, and a single arm-retaining bolt extending across the converging ends of said reel and bracket-arms, and adapted to draw both of said arms to their seats and hold them in place against the arms of said supporting-bracket; a sprocket-wheel revolubly supported upon the opposite end of said hollow shaft from said reel; radial arms rigidly connected to said shaft in close proximity to one side of said sprocket-wheel, the opposing surfaces of said sprocket-wheel and radial arms being provided with contact-bearing lugs, by which motion is communicated from said sprocket-wheel to said arms and hollow shaft as the same is revolved; a spiral spring centrally located in said hollow shaft, said spring being connected at one end at a fixed point to said shaft, and at its opposite end with the hub of said sprocket-wheel through an adjustable bolt or rod, and means for adjusting and applying the tension of said spring to the face of the hub of said sprocket-wheel, whereby said bearing-lugs are yieldingly retained in contact, substantially as, and for the purpose specified.

4. In a harvester-reel; the combination of a reel-supporting shaft; a hub comprising two wheels having radial arms, and a connecting-sleeve formed integrally, secured to one end of said shaft; the respective arms of one of said wheels being provided with trunnions, and the arms of the other wheel being provided with sockets; a plurality of brackets, each comprising two arms, one a radial arm formed at nearly right angles to the longitudinal axis of the reel, and the other at an oblique angle to such axis, one side of each of said brackets being provided with a trunnion adapted to engage in the sockets formed on the arms of said wheel and the other side of said brackets being provided with sockets for the reception of the trunnions formed on the arms of the other wheel, whereby said brackets are each adapted to be pivotally connected at their respective sides with the respective sides of said hub; a reel-arm secured to each of said bracket-arms, and a single arm-retaining bolt extending across the converging ends of said reel and bracket-arms, and adapted to draw both of said arms to their seats and hold them in place against the arms of said supporting-bracket.

5. In a harvester-reel, a plurality of brackets each comprising two arms, each of said arms furnishing a seat for a reel-arm, said seats each being on the side of the bracket-arm farthest from the other bracket-arm.

6. In a harvester-reel, the combination of a reel-supporting shaft, a hub comprising two star-wheels secured on said shaft, the respective arms of one of said wheels being provided with trunnions, and the arms of the other wheel being provided with sockets, brackets pivoted to said arms, one side of each of said brackets being provided with sockets for the reception of said trunnions, and the other side of said brackets being provided with trunnions adapted to engage the first-mentioned sockets, and reel-arms secured to said brackets.

7. In a harvester-reel, two star-wheels rigidly secured to the reel-shaft, one of said wheels bearing trunnions; a bracket pivoted to arms upon said wheels, a pair of reel-arms secured to said bracket by means of a bolt passing through them and through the bracket, a wheel rigidly secured to the shaft, another wheel pivoted on said shaft and a spring secured inside the shaft and adapted to hold the two wheels yieldingly in engagement.

In testimony whereof I affix my signature in the presence of two witnesses.

GUSTAVUS A. PADDOCK.

Witnesses:
JAS. B. ERWIN,
N. J. TAUGHER.